United States Patent [19]

Creek

[11] Patent Number: 5,237,770
[45] Date of Patent: Aug. 24, 1993

[54] FLY FISHING ROD AND REEL COMBINATION

[76] Inventor: Wilson Creek, 717 SW. Second St., Ontario, Oreg. 97914

[21] Appl. No.: 552,152

[22] Filed: Jul. 13, 1990

[51] Int. Cl.$^5$ .................... A01K 87/00; A01K 87/06
[52] U.S. Cl. .......................................... 43/22; 43/23
[58] Field of Search .......................... 43/20, 22, 23

[56] References Cited

U.S. PATENT DOCUMENTS

| | | | |
|---|---|---|---|
| 484,439 | 10/1892 | Lockwood | 43/22 |
| 1,898,323 | 2/1933 | Teetor | 43/22 |
| 2,512,170 | 6/1950 | Oen | 43/22 |
| 2,559,433 | 7/1951 | Hurd | 43/20 |
| 2,600,259 | 6/1952 | Palmer | 43/20 |
| 2,711,292 | 6/1955 | Taggart | 242/84.4 |
| 4,244,132 | 1/1981 | Hoffman | 43/21.2 |
| 4,651,461 | 3/1987 | Williams | 43/22 |
| 4,815,228 | 3/1989 | Abel | 43/22 |

Primary Examiner—Kurt Rowan
Attorney, Agent, or Firm—Frank J. Dykas; Craig M. Korfanta; Ken J. Pedersen

[57] ABSTRACT

A fly rod and reel combination (10) is disclosed which includes an elongated arcuate reel positioning member (16). Fly rod (11) is provided with a hollow butt end (13) and a hollow cylindrical extension (19) having a set of male threads (20) on its outside surface. Fly reel (28) is attached to a second end (25) of an elongated arcuate reel positioning member (16) which has a positioner extension member (18) attached to a second end. Positioner extension member (18) is sized and shaped to be frictionally received by cylindrical extension (19). A stop flange (22) is radially attached around the first rod attachment end (17) of the elongated arcuate reel positioning member (16) between it and positioner extension member (18). Flange (22) prevents the rod attachment end of the elongated arcuate reel positioning member (16) from entering into the hollow cylindrical extension (19) when positioner extension member (16) is engaged therein. A coupler nut having a set of female threads (24) is slidably and rotatably engaged on the main elongated portion of the reel positioning member (16) and is further configured to encompass stop flange (22) and engage male threads (20) on the outer surface of the cylindrical extension (19), thereby coupling the elongated arcuate reel positioning member (16) to the fly fishing rod (11).

1 Claim, 8 Drawing Sheets

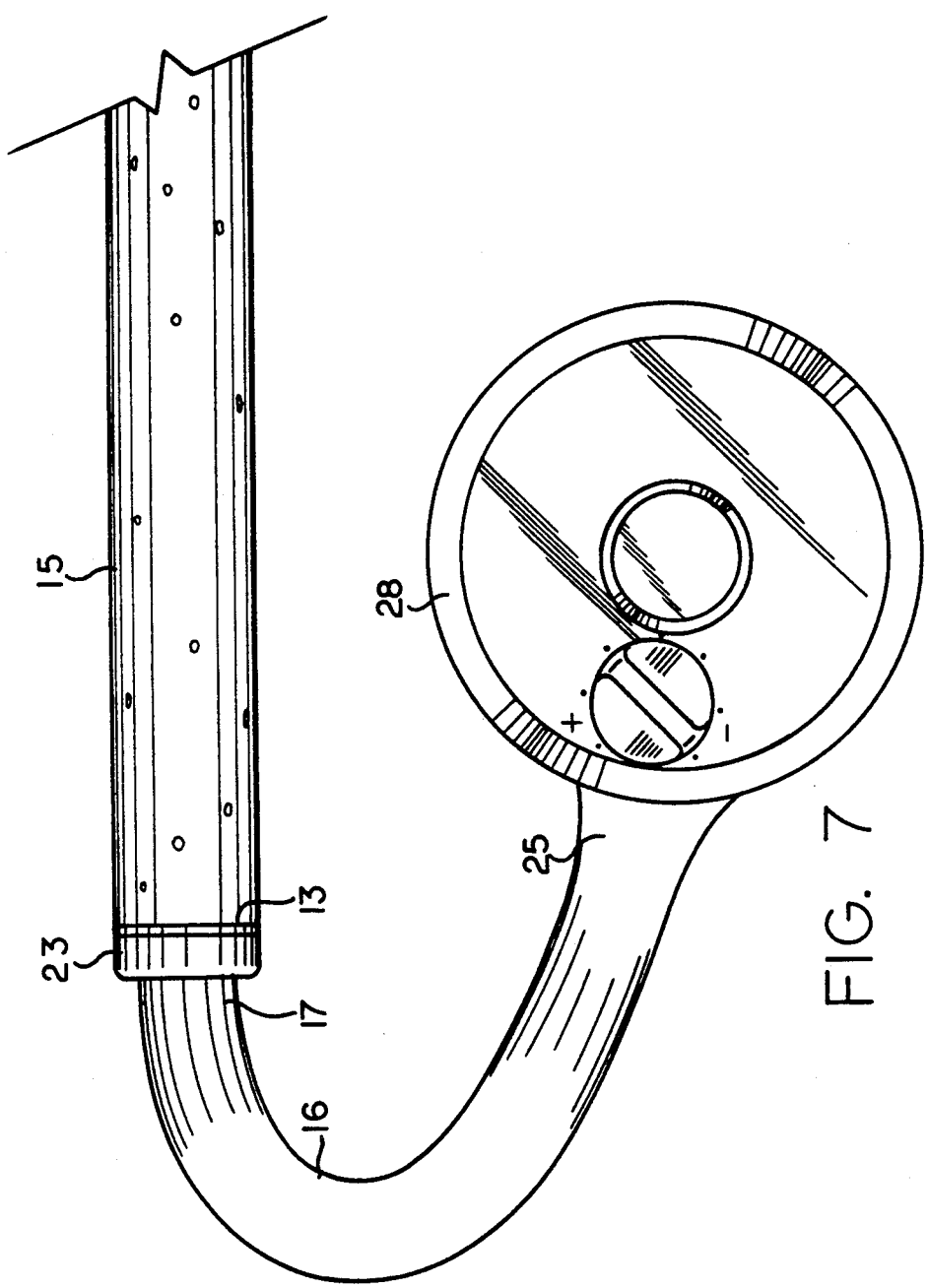

FLY FISHING ROD AND REEL COMBINATION

BACKGROUND OF THE INVENTION

1. Technical Field

This invention generally relates to fishing equipment and in particular it relates to a specific configuration of a fly fishing rod and reel combination.

2. Background Art

In most types of sport fishing techniques, e.g., fly casting, bait casting and spin casting, the objective is to project or to "cast" an artificial lure or live bait, having fishing line attached thereto, into fish filled waters in hopes that a fish will take the bait. Because fish are easily spooked by the presence of a human, it is necessary for fishermen to cast his bait a great distance away from his person. The energy which propels both the lure and the fishing line is stored and subsequently released by a thin elongated flexible rod, commonly known as a fishing pole. When the rod releases the potential energy, the energy is transmitted to the fishing lure and propels the fishing lure horizontally over the surface of the water.

This phenomenon is relatively easy to understand in the cases of both bait and spin casting where the lure or bait is relatively heavy. In these instances the mechanics of the back cast, coupled with the weight of the lure, cause the fishing rod to flex as the fisherman starts the forward cast, thereby storing energy in the rod. At the end of the forward cast as the rod straightens out, the line is released and allowed to move freely across the water.

In fly casting however, the artificial lures or "flies" used are extremely light weight and are incapable of causing the rod to flex. In fact, the lures are so light weight that the resistance due to air friction cannot be overcome unless the fly is attached to a heavier object. Hence, a fly fisherman is really casting the fly line rather than the fly itself. Accordingly, a great deal of effort has been expended on designing fly lines and tailoring casting methods to efficiently propel the line through the air.

It is well known that one of the most important parameters for a fly caster to control is the diameter of the loop created in the line by the casting motion. This loop travels along the line in the directions of both the forward cast and the back cast and actually defines the transition point between the accelerating portion of the fly line and the decelerating portion of the fly line. Since the loop moves along the fly line, it is subject to the effects of air friction. It is easy to understand then, that the larger loop diameter, the greater the resistance due to air friction and the less efficient the cast will be.

Through years of refinement, fly casters have found that the smallest loop can be maintained by keeping the rod tip in substantially a horizontal plane with respect to the ground. This technique is contrary to the traditional bait and spin casting techniques where the rod and reel are swung through an arc about the fisherman's shoulder and elbow. Additionally, in both bait and spin casting, there is an exaggerated wrist pivot which accelerates the rod tip through the cast arc. During a fly cast, on the other hand, only subtle wrist movement is used to accelerate the rod tip. If too much wrist movement is present, the diameter of the loop increases, greatly reducing casting efficiency. Additionally, the timing between forward and back cast is of critical importance as the line can act like a bull whip and actually snap the fly off of the attached leader.

FIG. 1A of the appended drawings shows the relative torque moments about pivot point P on the rod handle, produced by the weight of the attached fly wheel associated with the standard fly fishing rod and reel combination known in the prior art. It is quite evident from this graphical analysis that the magnitude of the torque moment changes quite drastically throughout a single pass of the casting motion. It is easy to comprehend how this greatly varying torque moment can ill effect casting efficiency, considering the criticality of the timing and the subtlety of the wrist movement. Additionally, because a typical fly fisherman can easily make more than a thousand casts in a day of fishing, it is equally easy to comprehend how continuously compensating for the changing torque moment can unduly fatigue a fisherman.

What is needed is a fly fishing rod and reel combination which provides a much smaller degree of variance in the relative magnitudes of the torque moment produced by the weight of the reel about the theoretical pivot point. It is therefore an object of the instant invention to provide a fly fishing rod and reel combination which is easier to cast and less fatiguing to use and which produces more efficient and longer casts.

DISCLOSURE OF INVENTION

These and other objects are accomplished by a unique connection of a fly reel to a fly rod. The fly reel is attached to the fly rod via an elongated arcuate extension which coextends outward from the butt or handle end of the rod. The arcuate member is shaped to dispose the attached fly reel at a point forward and below the butt end of the rod. FIG. 1B illustrates the basic configuration of the instant invention and graphically depicts the torque moments associated with this configuration. Comparing FIGS. 1A and 1B, one can see how the torque moments associated with the instant invention are much more consistent and constant than those associated with the prior art.

The instant fly rod and reel combination incorporates a standard fly rod and fly reel with some small modifications. Firstly, the fly rod is Provided with a hollow butt end and a hollow cylindrical extension having a set of male threads on its outside surface. The fly reel is attached to a first end of an elongated arcuate reel positioning member which has a positioner extension member attached to a second end. The positioner extension member is sized and shaped to be frictionally received by the cylindrical extension and hollow butt end of the rod. A stop flange is radially attached around the second rod attachment end of the elongated arcuate reel positioning member between it and the positioner extension member. This flange prevents the rod attachment end of the elongated arcuate reel positioning member from entering into the hollow cylindrical extension when the positioner extension member is engaged therein. A coupler nut having a set of female threads is slidably and rotatably engaged on the main elongated portion of the reel positioning member and is further configured to encompass the stop flange and engage the male threads on the outer surface of the cylindrical extension, thereby coupling the elongated arcuate reel positioning member to the fly fishing rod. A registration system is provided such that when the elongated arcuate reel positioning member is engaged in the hollow end of the fly rod, the attached fly reel is automatically aligned with the rod guides on the fly fishing rod.

BRIEF DESCRIPTION OF THE DRAWINGS

FIG. 7 is a second partial side view of the fly fishing rod and reel combination;

BEST MODE FOR CARRYING OUT INVENTION

Figure 1A:
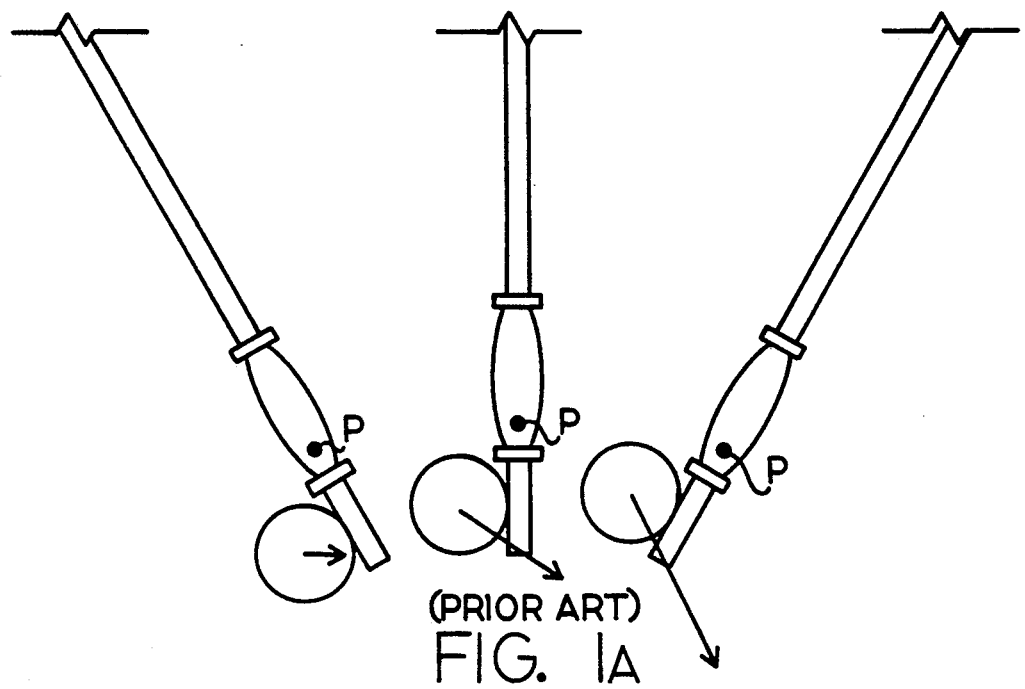
FIG. 1A graphically depicts the torque moment associated with the prior art rod and reel combination.
Figure 1B:
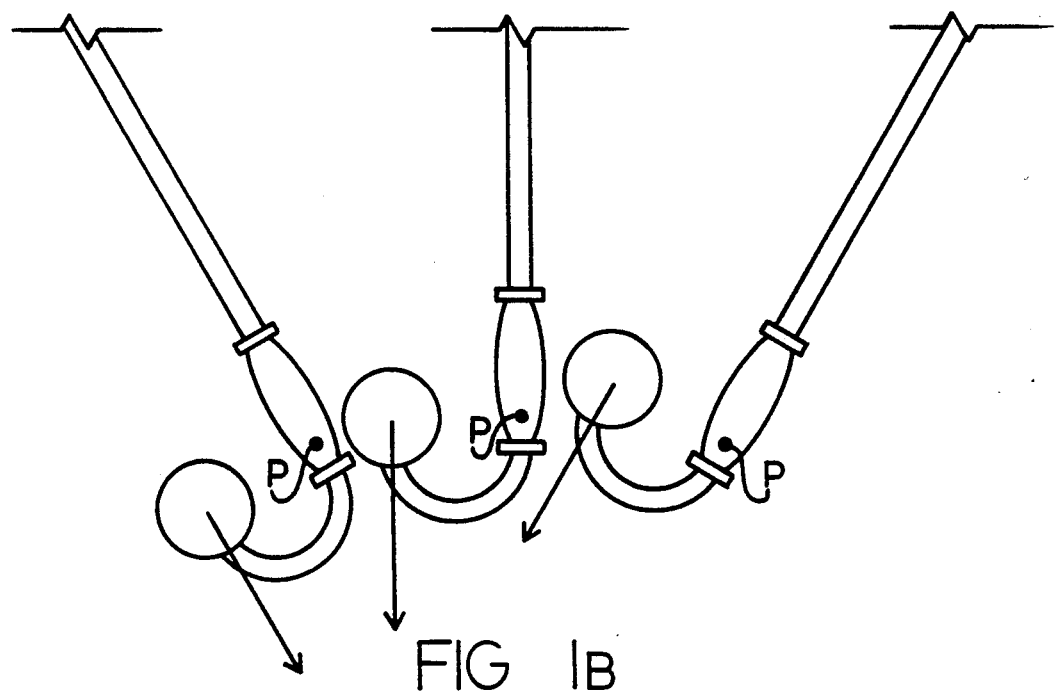
FIG. 1B graphically depicts the torque moment associated with the instant fly fishing rod and reel combination.
Figure 2:
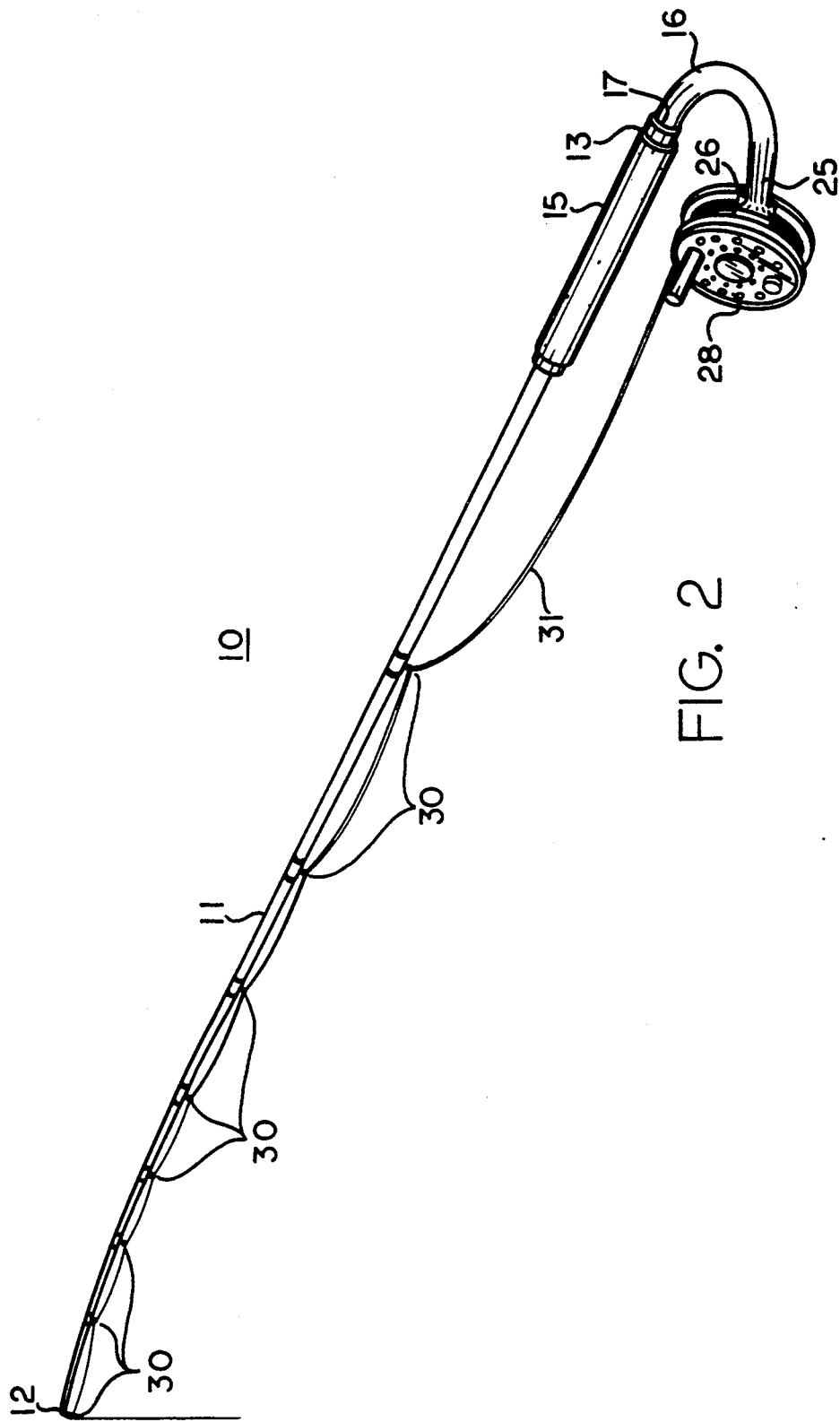
FIG. 2 is a three quarter elevation view of the instant fly fishing rod and reel combination.
Figure 3:
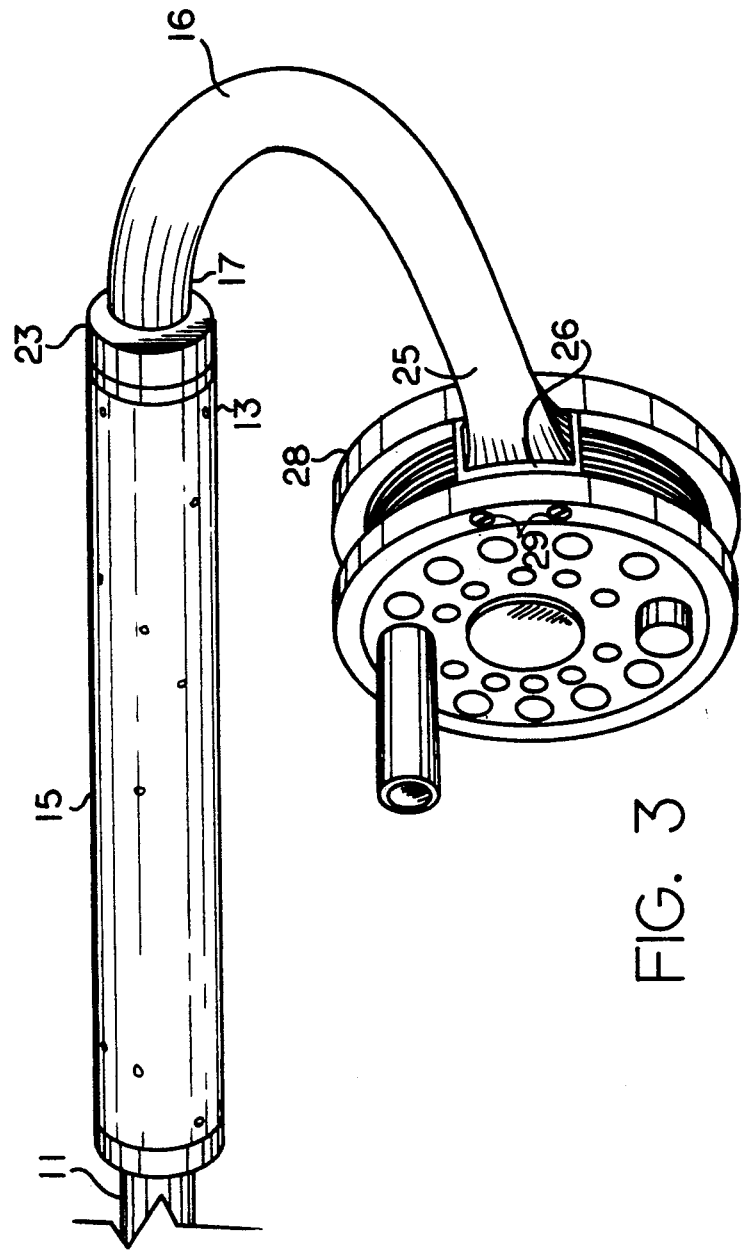
FIG. 3 is an enlarged partial view of the fly fishing rod and reel combination.
Figure 4:
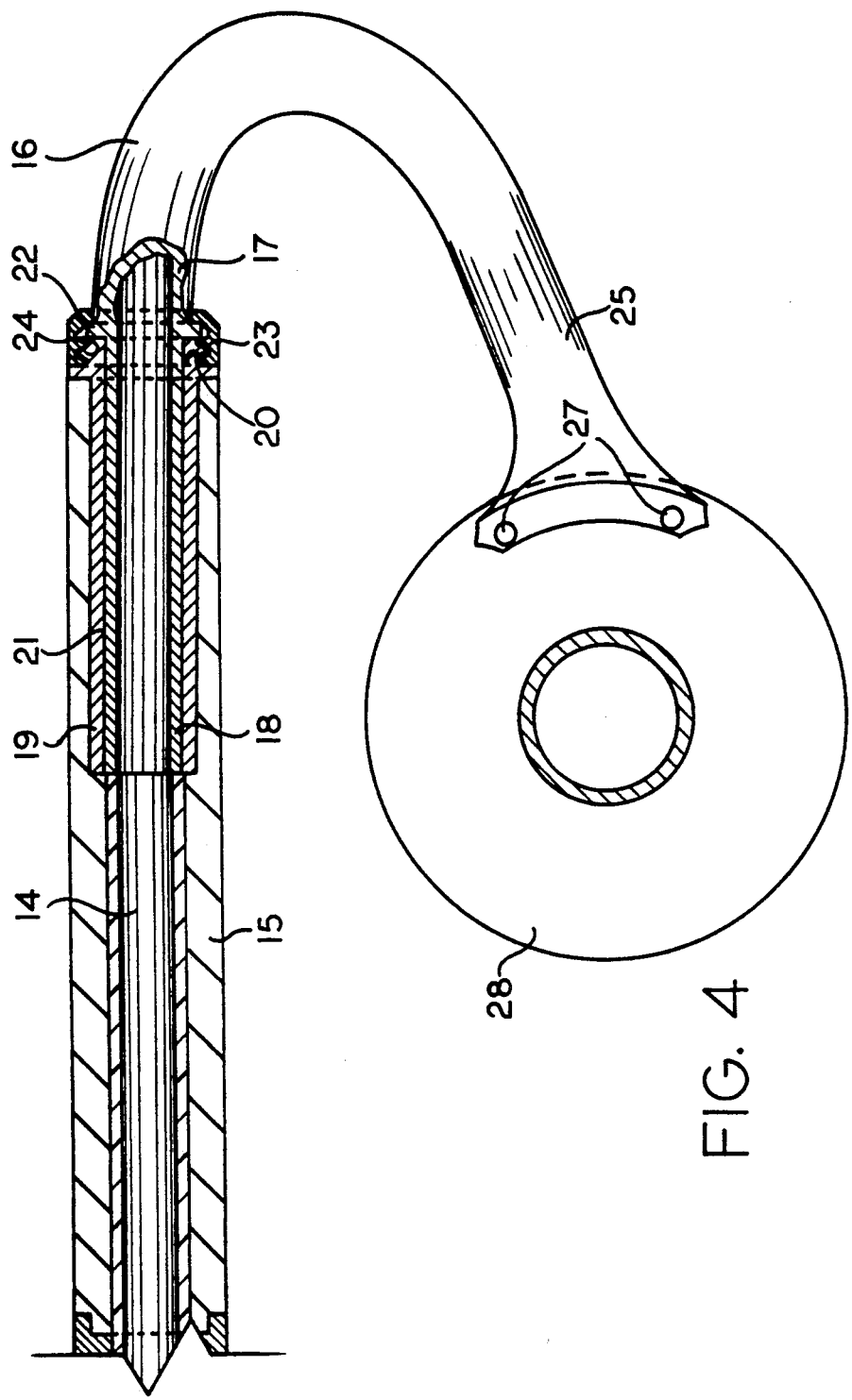
FIG. 4 is a side partial cross-sectional view of the fly fishing rod and reel combination.
Figure 5:
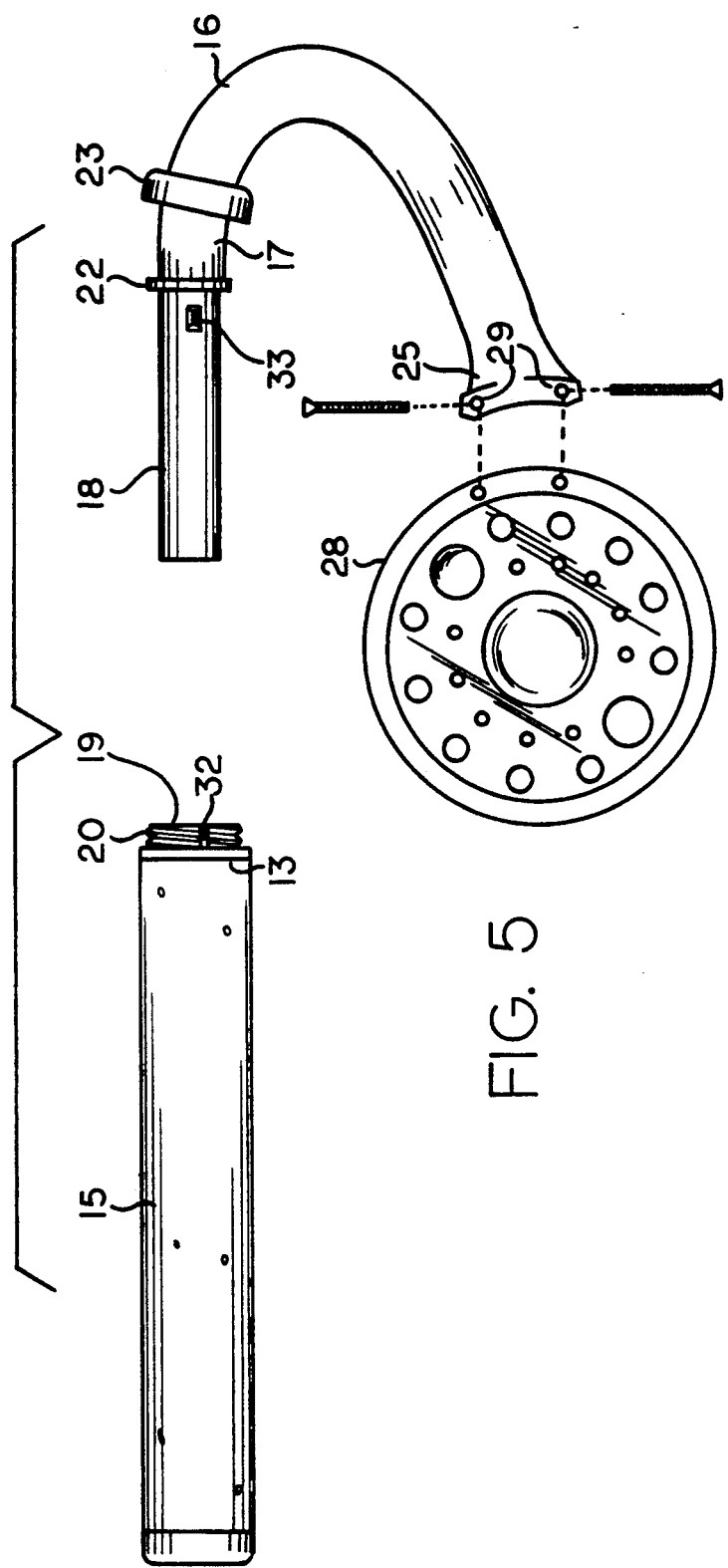
FIG. 5 is an exploded side view of the fly fishing rod and reel combination.
Figure 6:
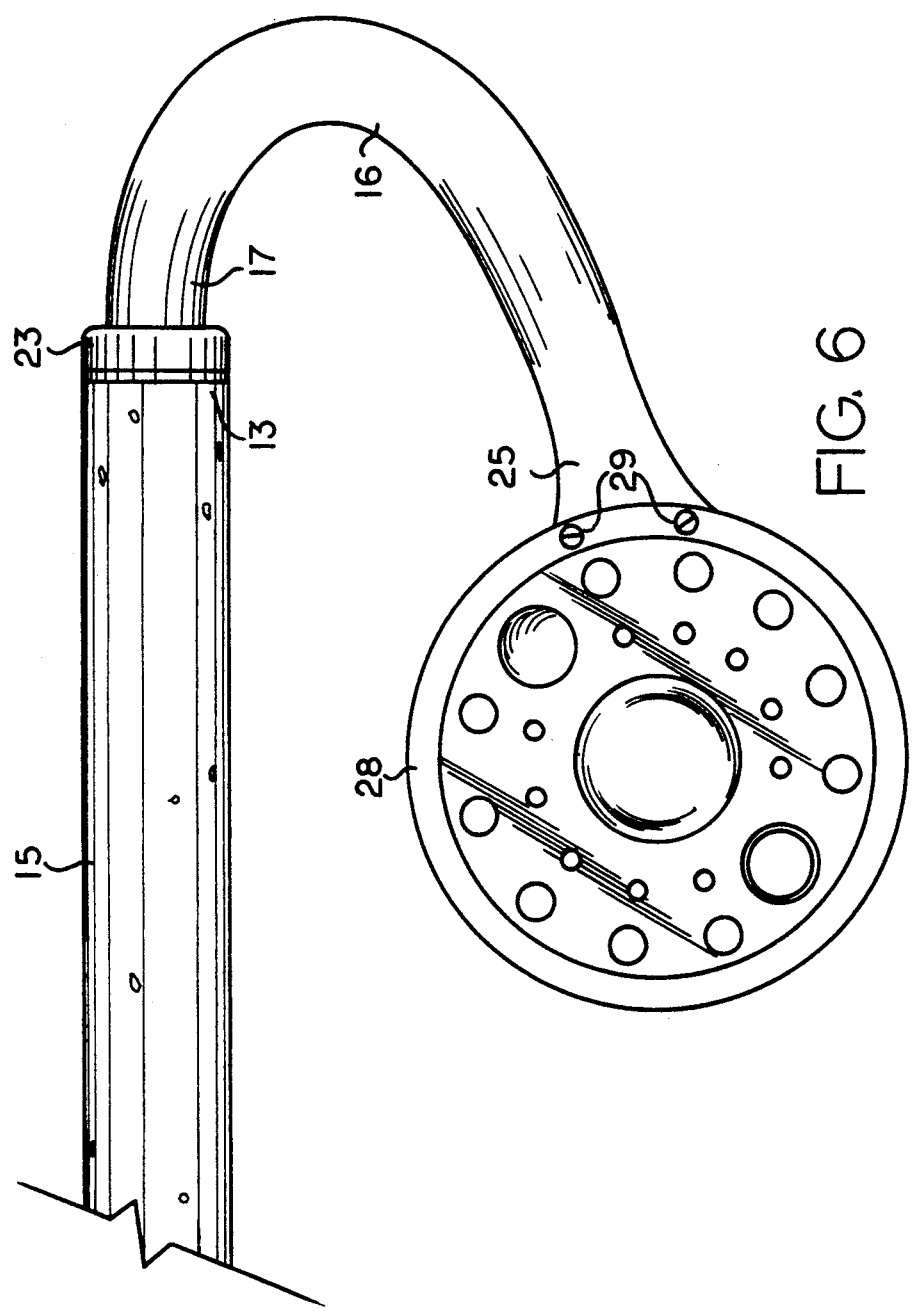
FIG. 6 is a first partial side view of the fly fishing rod and reel combination.
Figure 9:
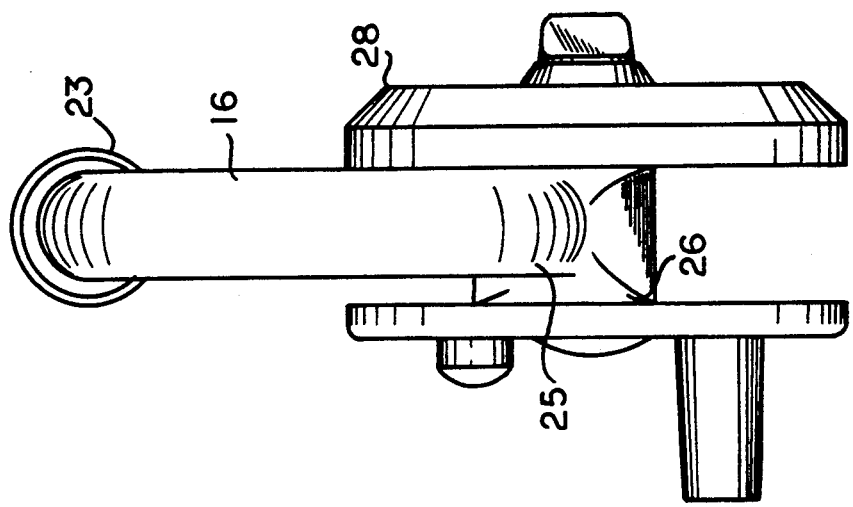
FIG. 9 is a back end view of the fly fishing rod and reel combination.
Figure 8:
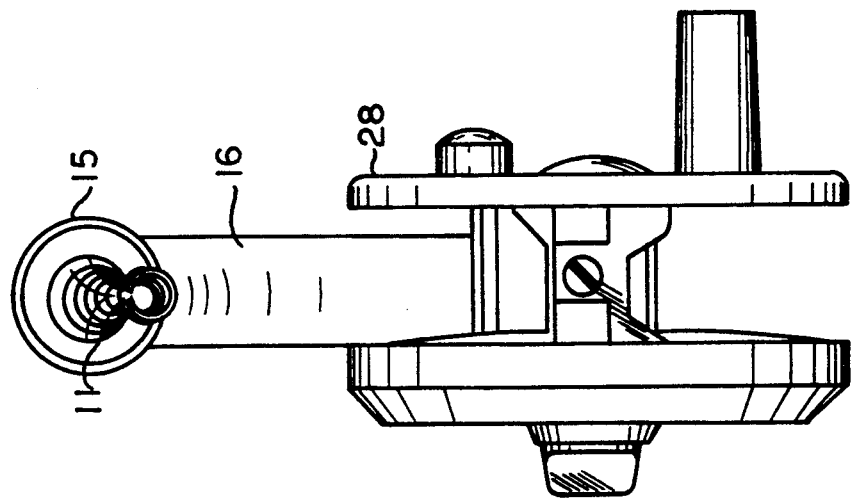
FIG. 8 is a front end view of the fly fishing rod and reel combination.

Referring now to FIGS. 2 through 5, the instant fly fishing rod and reel combination is illustrated and is designated by the number 10. Fly fishing rod and reel combination 10 uses an elongated arcuate reel positioning member 16 to attach a fly reel 28 to the butt or handle end 13 of rod member 11. Reel positioning member 16 is configured to dispose an attached fly reel 28 below and forward of handle end 13 and to align reel 28 with line guides 30 along the length of rod 11 from a point forward of handle 15 out to tip end 12.

Reel positioning member 16 includes a rod attachment end 17 and a reel attachment end 25. Rod attachment end 17 has a positioner extension member 18 attached thereto which is sized and shaped to frictionally engage in the hollow interior 14 of rod member 11 and the bore 21 of cylindrical extension member 19. Cylindrical extension 19, which includes set of male threads 20 about its exterior surface, coaxially extends from the handle end 13 of rod member 11. Cylindrical extension 19 also includes a positioning dog receiving slot 32, which cooperates with positioning dog 33 to radially align reel positioning member 16 with respect to guides 30.

Positioner extension member 18 has positioning dog 33 radially attached and coaxially aligned on its outer cylindrical surface such that when it is in engagement with positioning dog receiving slot 32 in cylindrical extension 19, elongated arcuate reel positioning member 16 is aligned with rod guides 30 such that fishing line 3 from fly reel 28 lies in a single plane. A coupler flange 22 is radially attached between the main elongated arcuate portion of reel positioning member 16 and positioner extension member 18. Coupler flange 22 has a diameter of approximately equal to that of cylindrical extension 19 such that coupler flange 22 acts as a stop for positioner extension member 18 when it is inserted in hollow interior 14 of rod member 11 through coaxial bore 21. Coupler nut 23 is slidably and rotatably engaged around the main elongated portion of reel positioning member 16 and is of sufficient size and diameter to encompass coupler flange 22 and engage the male threads 2( on cylindrical extension 19, using a set of female threads 24 circumvolving its inner surface, thereby positively and removably attaching elongated arcuate reel positioning member 16 to rod member 11.

Arcuate reel positioning member 16 has a reel foot 26 formed at its reel attachment end 25 for attaching fly reel 28. Reel foot 26 includes reel attachment holes 27 for receiving foot attachment screws 29 of fly reel 28. It should be apparent that the configuration of reel foot 26 could be varied if desired and depending upon the configuration of fly reel 28.

Fly fishing rod and reel combination 10 is used identically to the prior art, with the exception of changing from one reel to another on a single fly rod. In the case of the instant invention, each fly reel 28 is provided with a separate elongated arcuate reel positioning member 16 such that one simply has to disengage coupler nut 23 to detach one particular fly reel. A second fly reel and elongated arcuate positioning member 16 is then installed and new coupler nut 23 is engaged with cylindrical extension 19.

While there is shown and described the present preferred embodiment of the invention, it is to be distinctly understood that this invention is not limited thereto but may be variously embodied to practice within the scope of the following claims.

I claim:

1. A fly fishing rod and reel combination which comprises:
   a rod member having a tip end and a handle end;
   a handle being attached around segment of said rod member at the handle end;
   an elongated arcuate reel positioning member having a rod attachment end and a reel attachment end;
   said rod attachment end being attached to said handle end by means to a positioner extension member removably attached to and coextending out from said rod attachment end, said positioner extension member being sized and shaped for frictional engagement within said handle end and coextending therefrom;
   said reel positioning member being configured to dispose its reel attachment end forward and below said rod attachment end, but being without a handle, and without a segment parallel to said rod attachment end, on said reel attachment end, and
   wherein the removably attachment of said reel positioning member to said rod member is accomplished by a removable attachment means which comprises a cylindrical extension being coaxially attached at the handle end of said rod member and having a set of male threads thereon and a coaxial bore therethrough for receiving said positioner extension member;
   a coupler flange being radially attached around the rod attachment end of said reel positioner member;
   a coupler nut being slidably and rotatably engaged around said elongated arcuate reel positioner member and said coupler flange, said coupler nut having a set of female threads therein for engagement with the male threads on said cylindrical extension; and,
   a fly reel being attached at the reel attachment end of said reel positioning member.

* * * * *